United States Patent
Dyer

(10) Patent No.: US 6,903,779 B2
(45) Date of Patent: Jun. 7, 2005

(54) METHOD AND SYSTEM FOR DISPLAYING RELATED COMPONENTS OF A MEDIA STREAM THAT HAS BEEN TRANSMITTED OVER A COMPUTER NETWORK

(75) Inventor: Thomas Christopher Dyer, Lewisville, TX (US)

(73) Assignee: Yahoo! Inc., Sunnyvale, CA (US)

( * ) Notice: Subject to any disclaimer, the term of this patent is extended or adjusted under 35 U.S.C. 154(b) by 525 days.

(21) Appl. No.: 09/859,564

(22) Filed: May 16, 2001

(65) Prior Publication Data

US 2002/0171760 A1 Nov. 21, 2002

(51) Int. Cl.$^7$ ............................ H04N 7/00; H04N 11/00
(52) U.S. Cl. ...................... 348/465; 348/468; 348/563; 725/137
(58) Field of Search ................................ 348/461, 465, 348/468, 478, 552, 563, 564; 725/137; H04N 7/00, 11/00

(56) References Cited

U.S. PATENT DOCUMENTS

| | | | | |
|---|---|---|---|---|
| 5,481,296 A | * | 1/1996 | Cragun et al. | 725/136 |
| 5,517,254 A | * | 5/1996 | Monta et al. | 348/569 |
| 5,576,768 A | * | 11/1996 | Gomikawa | 348/468 |
| 5,671,019 A | * | 9/1997 | Isoe et al. | 348/565 |
| 5,703,655 A | * | 12/1997 | Corey et al. | 348/468 |
| 5,708,475 A | * | 1/1998 | Hayashi et al. | 348/468 |
| 5,835,153 A | * | 11/1998 | Pratt et al. | 348/468 |
| 5,945,987 A | * | 8/1999 | Dunn | 345/718 |
| 6,025,837 A | * | 2/2000 | Matthews et al. | 345/721 |
| 6,061,056 A | * | 5/2000 | Menard et al. | 345/704 |
| 6,239,843 B1 | * | 5/2001 | Gaudreau | 348/465 |
| 6,243,676 B1 | * | 6/2001 | Witteman | 704/243 |
| 6,260,194 B1 | * | 7/2001 | Shiels et al. | 725/134 |
| 6,266,094 B1 | * | 7/2001 | Taylor, Jr. | 348/465 |
| 6,285,407 B1 | * | 9/2001 | Yasuki et al. | 348/554 |
| 6,295,092 B1 | * | 9/2001 | Hullinger et al. | 348/468 |
| 6,308,329 B1 | * | 10/2001 | Takahashi | 725/153 |
| 6,348,951 B1 | * | 2/2002 | Kim | 348/564 |
| 6,412,111 B1 | * | 6/2002 | Cato | 725/137 |
| 6,425,061 B1 | * | 7/2002 | Kaise et al. | 711/163 |
| 6,532,041 B1 | * | 3/2003 | Monta et al. | 348/468 |
| 6,564,383 B1 | * | 5/2003 | Combs et al. | 725/136 |
| 6,567,127 B1 | * | 5/2003 | Orr et al. | 348/478 |
| 6,642,966 B1 | * | 11/2003 | Limaye | 348/473 |
| 6,661,467 B1 | * | 12/2003 | Van Der Meer et al. | 348/564 |
| 6,701,524 B1 | * | 3/2004 | Okamura et al. | 725/37 |
| 6,710,812 B2 | * | 3/2004 | Taylor et al. | 348/465 |
| 6,724,431 B1 | * | 4/2004 | Aton | 348/461 |
| 6,742,188 B1 | * | 5/2004 | Del Castillo | 725/153 |
| 6,766,163 B1 | * | 7/2004 | Sharma | 455/412.1 |
| 6,766,528 B1 | * | 7/2004 | Kim et al. | 725/113 |
| 6,775,842 B1 | * | 8/2004 | Van Gestel | 725/136 |
| 6,816,201 B1 | * | 11/2004 | Fang et al. | 348/468 |
| 2001/0039546 A1 | * | 11/2001 | Moore et al. | 707/10 |
| 2001/0049826 A1 | * | 12/2001 | Wilf | 725/120 |
| 2002/0023165 A1 | * | 2/2002 | Lahr | 709/231 |
| 2002/0059637 A1 | * | 5/2002 | Rakib | 725/119 |
| 2002/0067428 A1 | * | 6/2002 | Thomsen | 348/465 |

(Continued)

FOREIGN PATENT DOCUMENTS

| | | | |
|---|---|---|---|
| EP | 0723369 | * | 7/1996 |
| WO | WO 99/12335 | * | 3/1999 |

Primary Examiner—Brian P. Yenke
(74) Attorney, Agent, or Firm—James J. DeCarlo, Esq.

(57) ABSTRACT

A system and method for displaying related components of a media stream that has been transmitted over a computer network includes at least one storage device that communicates with a television decoder and with the video display. Information from one or more components of the media stream is extracted from the media stream and delivered to one or more storage devices. This stored component is subsequently transmitted to the video display in response to an information release signal that is embedded in the information. The invention can be used to display closed caption and other information with associated audio and video signals using an audio-visual media player.

41 Claims, 5 Drawing Sheets

U.S. PATENT DOCUMENTS

| | | | |
|---|---|---|---|
| 2002/0078144 A1 * | 6/2002 | Lamkin et al. | 709/203 |
| 2003/0020671 A1 * | 1/2003 | Santoro et al. | 345/1.3 |
| 2003/0212997 A1 * | 11/2003 | Hejna, Jr. | 725/88 |
| 2003/0227568 A1 * | 12/2003 | Stahl et al. | 348/552 |
| 2004/0012717 A1 * | 1/2004 | Sprague et al. | 348/564 |
| 2004/0040042 A1 * | 2/2004 | Feinleib | 725/112 |
| 2004/0045040 A1 * | 3/2004 | Hayward | 725/135 |
| 2004/0080528 A1 * | 4/2004 | Rand et al. | 345/738 |

* cited by examiner

METHOD AND SYSTEM FOR DISPLAYING RELATED COMPONENTS OF A MEDIA STREAM THAT HAS BEEN TRANSMITTED OVER A COMPUTER NETWORK

FIELD OF THE INVENTION

This invention relates to a system and apparatus for displaying related components of a media stream that has been transmitted over a computer network. More specifically, the invention relates to delivering closed caption and other information that may be included in the television broadcast to an audio-visual media player.

BACKGROUND OF THE INVENTION

In order to display video on a television monitor, an electron gun inside the monitor's cathode ray tube moves across the screen line by line as it scans its way down to the bottom of the screen. Video transmission is delayed while the electron gun moves back up to the top of the tube to display the next image. During this delay, called the vertical blanking interval ("VBI"), other data may be delivered to the display. For example, closed captioning text, stock market tickers and news and weather updates are often embedded in television broadcast signals. In particular, closed caption data is typically embedded in the broadcast at line 21 of the VBI. This system allows the more data to be delivered to the television and, therefore, provides for more efficient operation.

Thanks to advances in streaming media technology, television signals can also be transmitted and viewed on the Worldwide Web. Streaming media generally includes a digitized set of images and sounds that are sent over the Internet and played for the viewer at an end user station in sequence. Significantly, the image and sounds are played as they arrive. The use of streaming media, therefore, allows an Internet user to avoid having to download an entire file before being able to play any audio or video. This often saves a substantial amount of time and eliminates considerable frustration.

While closed caption and other information is easily displayed on a television set, currently available streaming media players cannot always display such information in an Internet browser. For example, closed caption data is typically not delivered in a format that can be used by a streaming media player. More specifically, closed caption data is typically delivered as single letters or in segments of words rather than as entire words or phrases. Thus, it must be displayed by a device that can simultaneously display information that is received at different times. In contrast, audio-visual media players are set up to receive information as a stream, and to continuously replace existing data with new data as it is received. Currently available methods, therefore, cannot typically be used to display closed caption text using an audio-visual media player.

SUMMARY OF THE INVENTION

The invention is generally directed to a system and apparatus for displaying components of a composite information stream that has been transmitted over a computer network. More specifically, the invention relates to displaying closed caption and other information that can be embedded in television signals in a Worldwide Web browser.

In one embodiment, the invention includes a system for simultaneously displaying multiple components of a composite information stream, which includes a storage device that has been configured to communicate with a decoder (or other device that is capable of parsing the composite stream into components) and with an information display system. The storage device is capable of receiving at least one component of the composite information stream from the information extractor, and of transmitting the composite information stream component to the information display system in response to an information release signal that is embedded in the information stream component.

In another embodiment, the invention includes an information storage device, such as a buffer or other computer storage device, that has been configured to communicate with a decoder and with an information display system. The buffer is capable of receiving at least a portion of the text information from the decoder, and is capable of transmitting the received text information to the information display system in response to an information release signal that is contained in the text information.

In accordance with an embodiment of the invention, a method of simultaneously displaying multiple types of information includes parsing multiple types of related information into a plurality of single information type components and collecting at least one of the single information type components in the storage device. At least one of the single information type components includes an information release signal. In accordance with the method, the content of the information storage device can be transferred to an encoder and forwarded over the Internet to an information display system in response to the information release signal. The information storage device content and at least one other corresponding single information type component are simultaneously presented on the display.

At least one embodiment of the invention includes a system for delivering closed caption information with a television broadcast. The closed caption data is delivered to the buffer, and retained there until a release signal is generated. When the release signal is detected, the entire content of the buffer is forwarded to an encoder and transmitted over the Internet to an audio-visual media player for display on a video monitor.

Other embodiments of the present invention and features thereof will become apparent from the following detailed description, considered in conjunction with the accompanying drawing figures.

BRIEF DESCRIPTION OF THE DRAWINGS

FIG. 2 is a system diagram illustrating one way that the present invention can be implemented in a system for displaying multiple components of a composite television signal on the Internet; and.

While the present invention will be described in connection with certain embodiments thereof, it is to be understood that the invention is not limited to those embodiments. On the contrary, it is intended to cover all alternatives, modifications, and equivalents as may be included within the spirit and scope of the invention as defined by the appended claims.

DETAILED DESCRIPTION OF EMBODIMENTS OF THE INVENTION

Figure 1:
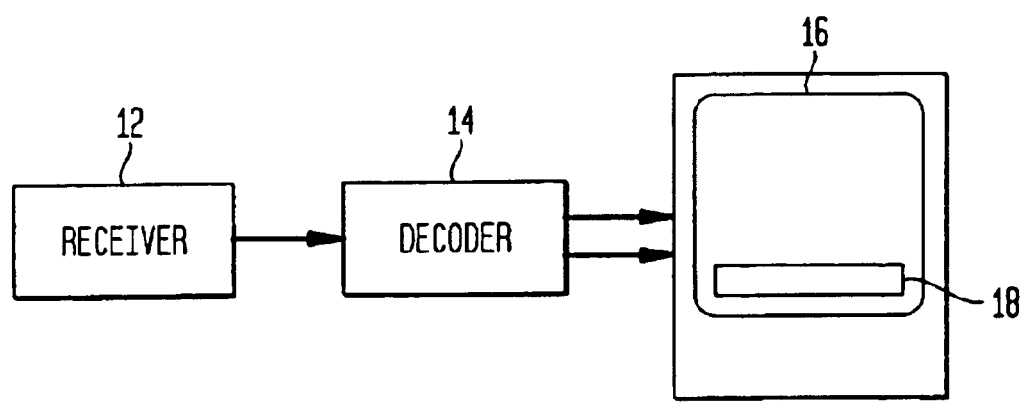
FIG. 1 is a schematic illustration that depicts an example of a commonly known system that is capable of simultaneously displaying related components of a television signal on a video monitor or similar device.

Referring now to the drawings which are provided to describe embodiments of the invention and not for limitation, FIG. 1 contains a schematic illustration of a system that can simultaneously display related components of a television signal on a television set, video monitor or similar device. Television signals can generally be described as composite information. That is, they contain multiple components of distinct types of information (e.g. audio, video, closed caption, etc.). Generally speaking, a system for displaying such information includes a receiver 12 to which the television signals are delivered from a television broadcast station, cable television provider, digital satellite system operator or other comparable source. Such television signals generally include audio and video information, and they may also include other types of data that relates to the program being broadcast. As shown, receiver 12 is linked to a decoder 14, which 14 may be located inside a set top box, or in a television set, video monitor or other device upon which television images will be displayed. While such a configuration is very common, it is also possible to provide a system 10 with a decoder 14 that is located at the broadcast station or in a remote location.

One readily available decoder 14 is a VBI decoder, which can be used to extract data that is delivered to the system in the vertical blanking interval of the television broadcast as described above. The VBI decoder can extract the desired portions of the television signal, and allow the remaining components to pass through as appropriate. Thus, separate components can be delivered to the speakers (for the audio component, not shown) and to designated regions 16 and 18 of the display for listening and viewing.

While a system such as that described with reference to FIG. 1, is adequate for displaying information on a television set, difficulties arise when it is desired to display television signals in other ways. For example, the growth in popularity of the Internet makes it desirable to deliver television signals to over the Worldwide Web. While the development of streaming media technology has made it possible to deliver the audio and video portions of the television signal to Internet users, audio-visual media players that are currently available cannot properly process all of the other components of the signals.

For example, media players are currently not configured to display closed caption data over the Internet. In a live video broadcast, this type of data is generally delivered to a television screen a single letter at a time or in small groups of letters. This is because the text must first be transcribed by a human operator, which obviously limits the rate at which the transcription can take place. Thus, entire sentences must be delivered to the display a single letter at a time. This is acceptable for delivery of data to a television set, because each letter can continue to be displayed on the screen until the entire word or sentence in which it is to be included is delivered to the screen and displayed. Also, slow delivery of the text to the television screen allows the viewer to be able to keep up with the text as it scrolls across the display region.

However, currently available Internet and other audio-visual media players are configured differently. Media players continuously replace existing data with new data as it is received. Thus, the first word of a sentence would be replaced by the second word, which would be replaced by the third word, etc., allowing only single words of the sentence to be displayed at a time. In order to transmit an entire sentence or more to an audio-visual media player, the system would have to send the first word and then replace it with both the first and second words, which would then be replaced by the first three words, and so on. Thus, it would be impossible to display entire sentences without including a large amount of unwanted data in the data stream. Known methods are, therefore, typically not used to deliver closed caption text to an audio-visual media player with corresponding audio and video.

Figure 2:
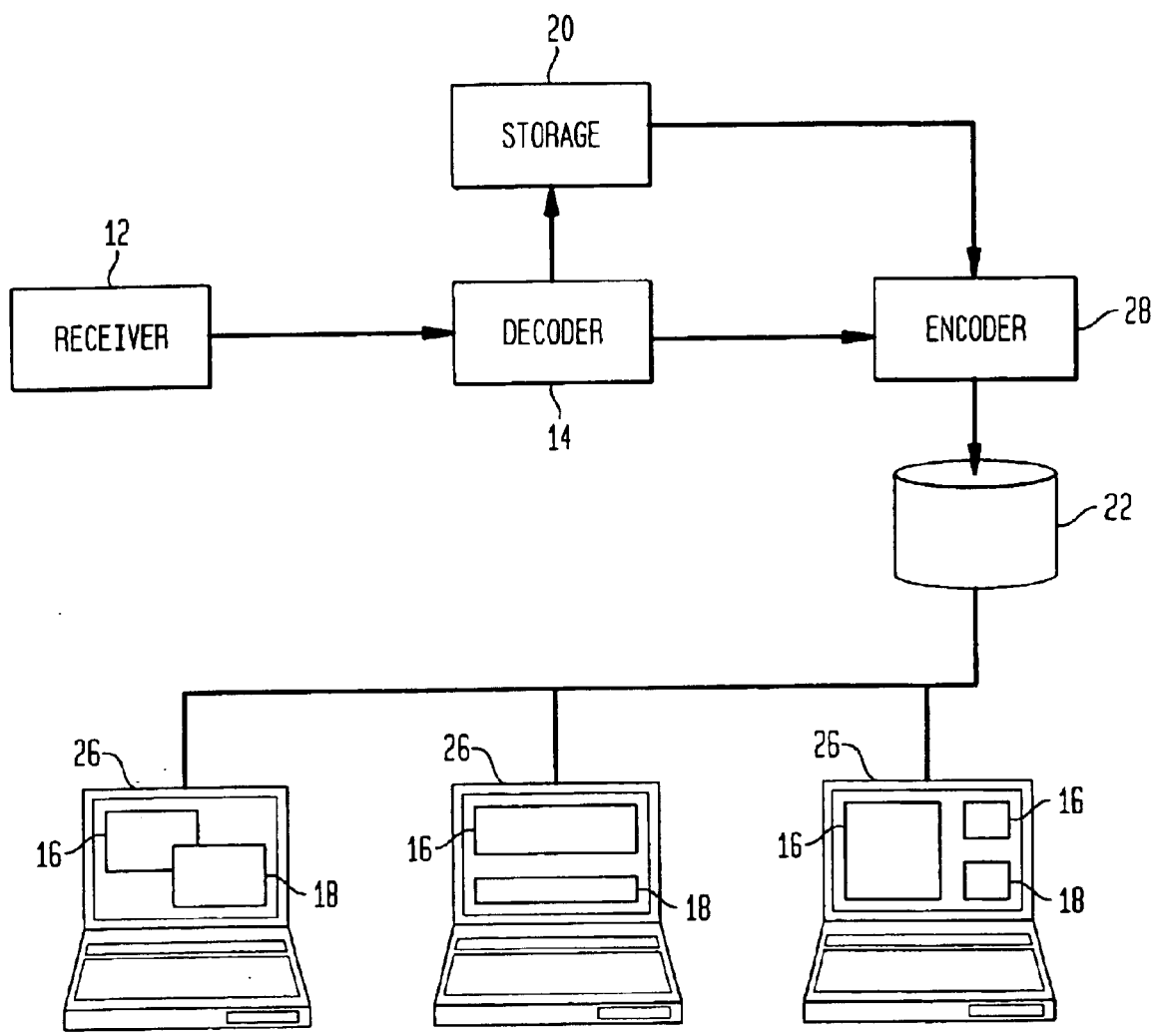

Referring to FIG. 2, according to the present invention, a storage device 20 is configured to receive the data that has been extracted from decoder 14 and to transmit it over a computer network such as the Internet, for display on a monitor or other appropriate output device that is linked to end user processor 26. An end user processor 26 may be a personal computer, personal digital assistant, Internet appliance or other now known or yet to be known device for receiving and delivering humanly perceptible digital information over a computer network. End user processors 26 typically include an Internet browser, such as Internet Explorer or Netscape Navigator, and a streaming media player such as Microsoft Windows Media Player, Real Networks' Real Player or a similar device. In one embodiment, storage device 20 is a buffer, which is commonly used in a computer system for the temporary storage of data. It should be noted that other storage devices, such as those that provide for the permanent storage of data could also be used. While the illustration shows one storage device 20 linked to a single decoder 14, it is to be understood that multiple decoders 14 and/or storage devices 20 could be provided. For example, multiple storage devices 20 could be linked to a single decoder 14 to store a large amount of a single component of extracted data. Or, a single decoder 14 could extract multiple types of data, and a separate storage device 20 could be provided for each type of extracted data. Another system could include multiple decoders 14, each of which extracts a different type of data from the television signals, and a separate storage device could be linked to each decoder 14.

As described earlier, television signals are delivered to receiver 12, and one or more components can be extracted by decoder 14. In one an embodiment of the invention, a component of the extracted information contains closed caption text data. This closed caption text is delivered to storage device 20, and is retained. When an appropriate signal is detected, the entire contents of storage device 20 are then transmitted, along with the components that are passed through decoder 14 without processing, to a media encoder 28. Encoder 28 merges the data to cause the extracted components to be delivered to the viewer simultaneously with the corresponding unprocessed components, and the merged data stream is delivered to streaming media server 22. End users may access streaming media and various other forms of content by viewing web sites at end user processors 26, and selecting various links.

Figure 3:
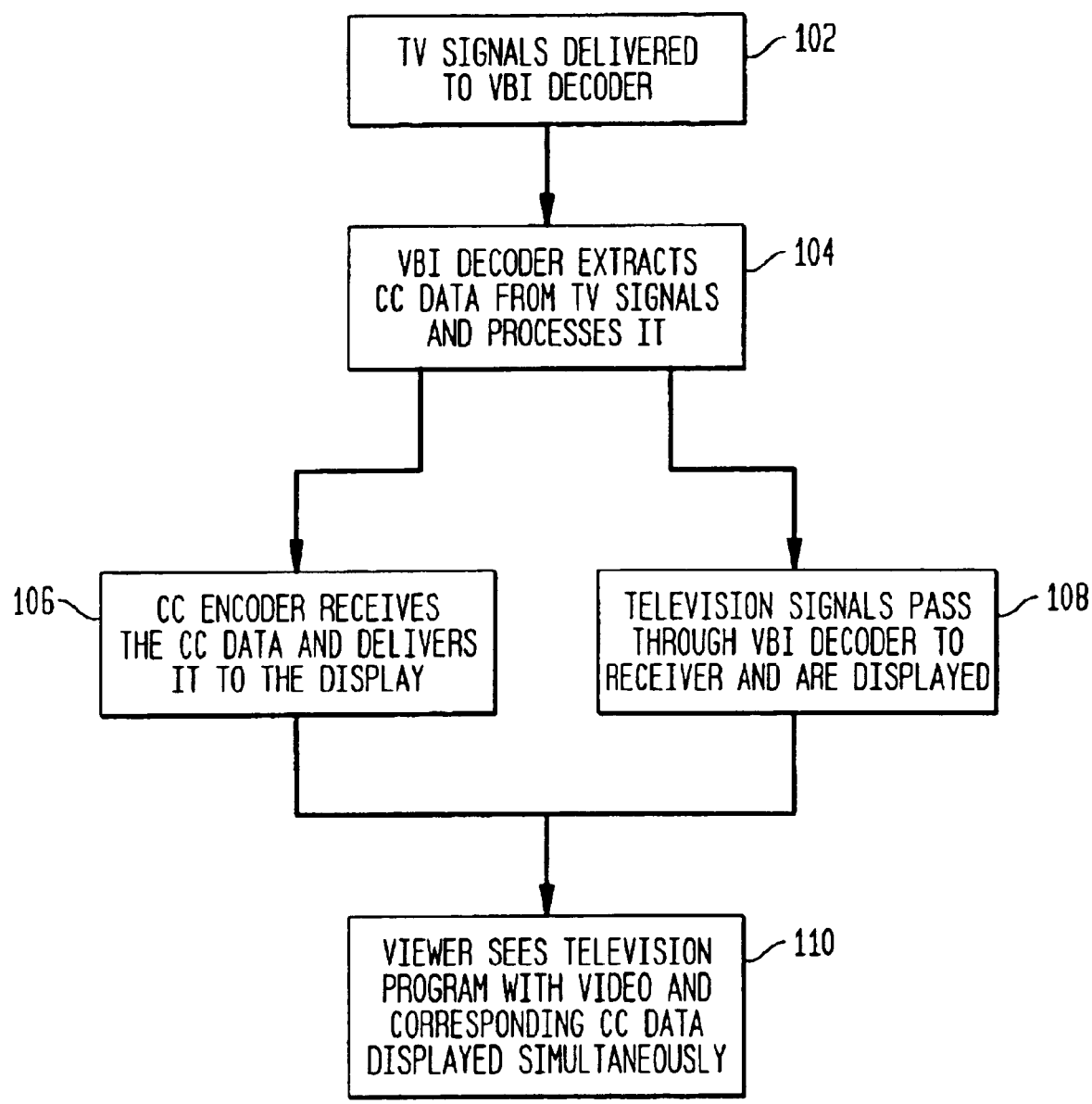
FIG. 3 is a flow diagram with exemplary steps that are currently followed to deliver audio and video data with corresponding closed caption data to viewer on a television monitor.

FIG. 3 is a block diagram that illustrates the steps for delivering multiple television signal components, such as audio, video and closed-caption data, to a television set or video monitor. As shown, television signals are delivered from receiver 12 to VBI decoder 14 at block 102, which extracts the relevant data at block 104. Unextracted portions of the signal are passed to television receiver 12 as indicated in block 18, while the extracted data is passed to an appropriate encoder as shown in block 106. The extracted data is processed, and delivered to the display, along with the unextracted portions of the signal as indicated in block 110.

One way in which embodiments of the invention may be incorporated into a system such as that described above as illustrated in FIG. 4. In this example, television signals that include closed caption text and corresponding audio and video signals, may be delivered over a computer network such as the Internet and displayed on a video monitor. As before, television signals are transmitted from receiver 12 to VBI decoder 14 as shown in block 202, which extracts the closed caption data as shown in block 204. As stated earlier, television signals could include other types of data, and while the invention is described with reference to closed caption data, it is not limited to such use.

After the closed caption data has been extracted, the remaining components of the television signal pass to media player encoder 28 as indicated in block 212. The extracted, closed caption data is delivered to a storage device as shown in block 206. As noted earlier, in one embodiment, the extracted data is stored in a buffer. In other embodiments, the extracted data may be stored in a permanent memory. In one embodiment of the invention, the extracted component (or components) is retained in storage device 20 until a release signal is detected as shown at block 208. This signal will typically be generated when an entire word, sentence or other designated set of information has been collected in storage device 20. In one embodiment of the invention, an ASCII "line feed" character (i.e. ASCII character 10) serves as the signal that causes the information to be released from storage. Such a character is often included in closed caption text at the end of a line, sentence or paragraph.

Figure 4:
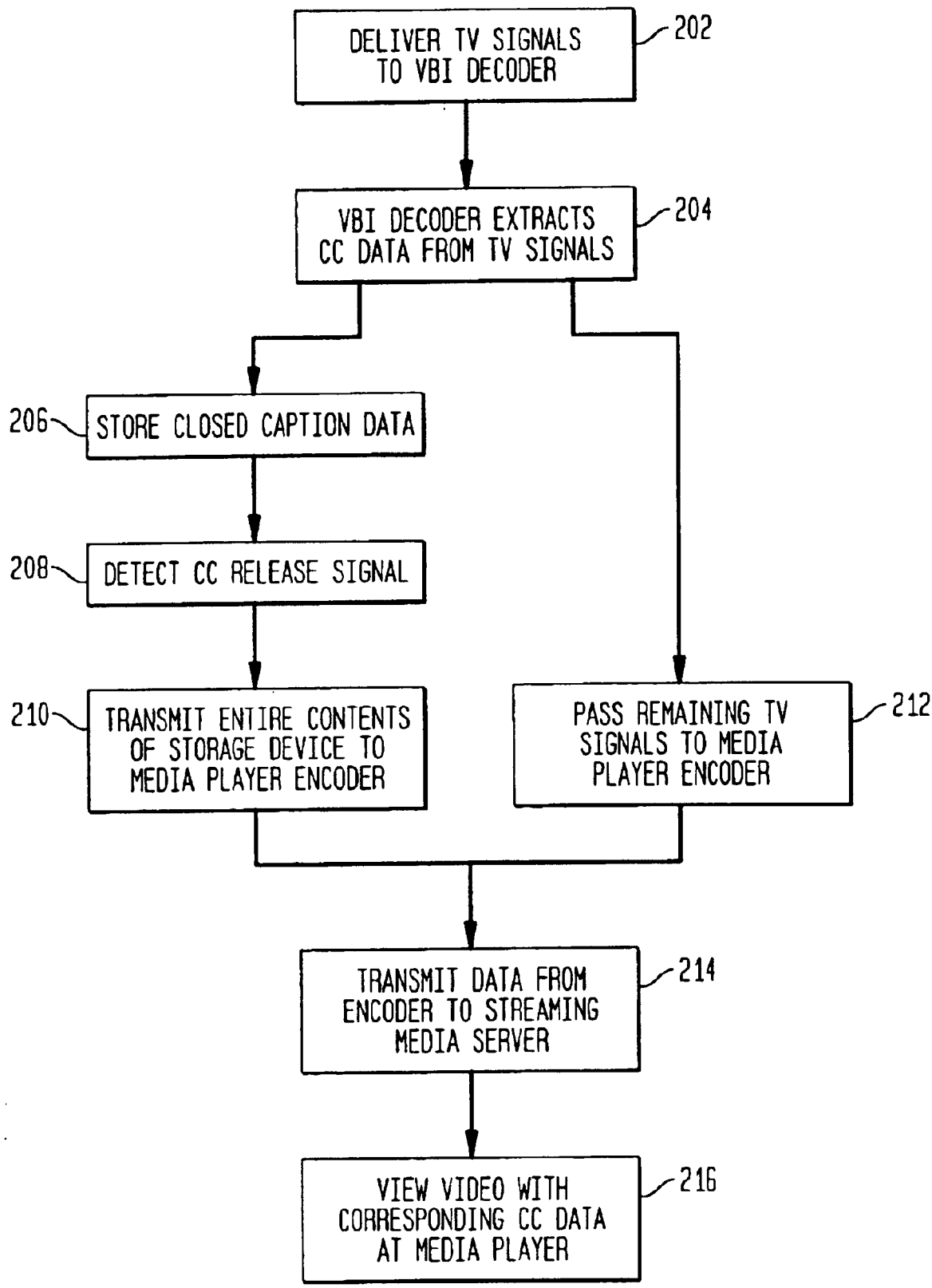
FIG. 4 is a flow diagram that illustrates steps that can be followed to display multiple components of a television signal, such as closed-caption data with corresponding audio and video to a viewer over the Internet.

With continued reference to FIG. 4, when the release signal is detected at block 208, all of the information that has been collected in storage device 20 is transmitted to media encoder 28 as shown in block 210. Corresponding components of the television signal—the extracted closed caption data and the audio and video data to which it relates—are then transmitted together from encoder 28 to streaming media server 22 as indicated in block 214. The components are delivered to media players at end user processors as shown in block 216 as they are requested by users.

It should be noted that the placement of blocks 210 and 212 adjacent to each other in FIG. 3 does not imply that the invention requires data to be delivered to the media player simultaneously. The steps will typically be performed in the manner that will cause the audio, video, closed caption and other components to be properly encoded for delivery to the streaming media server in a way that will cause the various components of the associated data to be played by the audio-visual player at the same time. Thus, any differences in processing speeds and transmission rates should be taken into account in order to designate any order or timing for performing steps 210 and 212.

In one embodiment of the invention, closed caption information is transmitted from storage device 20 as a text script command. As explained earlier, the text script command is transmitted to media encoder 28 at block 210 and sent to the streaming media server 22 at as indicated in block 214. Closed caption information can be provided in several different types of script commands. In one embodiment, it may be delivered as ordinary text, which is displayed in a designated region 18 of the display. In another embodiment, the closed caption information may be provided as a Universal Resource Locator (URL) that is launched by the media player in a browser window (i.e. a "Slide Flip"). In still another embodiment, a customized script command may be provided. In such a case, the HTML file usually includes custom script code, which can be interpreted by the media player.

The functions that are illustrated in the various blocks of FIG. 4 can be incorporated into a visual basic application, or similar program. While these embodiments of the invention have been illustrated has being suitable for display on end user processors 26 that are connected to video monitors, it is to be understood that numerous display devices including, but not limited to, laptop computers and handheld personal digital assistants can be used. It should also be noted that the television signal components can be displayed on different devices if desired. Thus, the invention could be incorporated into a system that displays only the closed caption component, and therefore enables a user to read the information that has been included in the television signal, when access to the audio and video components cannot be provided. This information could also be displayed on a marquee or other large device, in order to provide useful information to those who are able to view it.

Figure 5:
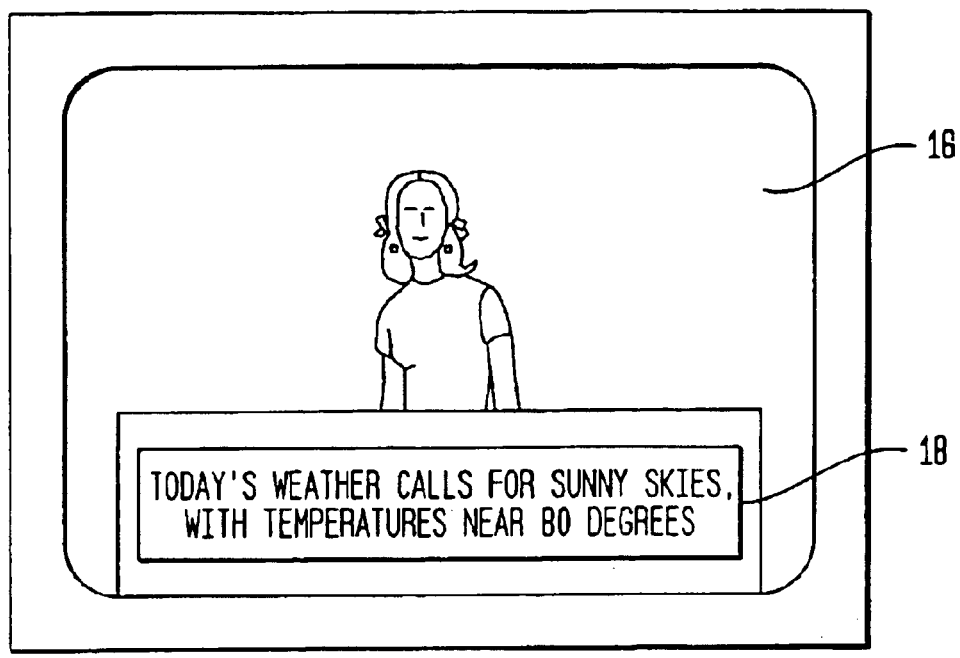
FIG. 5 is a schematic illustration of a television set with video and closed caption data displayed in the viewing area.

As indicated earlier, television systems which simultaneously display video data with corresponding closed caption data are well known. In these systems, video signals are typically displayed in a substantial region 16 of the viewing area while closed caption data is displayed in a smaller region 18, as indicated in FIG. 5. Because television screens are relatively large—often on the order of 27 inches in diameter to 35 inches or more—closed caption data that is displayed in the relatively small region 18 is usually still easily interpreted by the viewer. In contrast, a video monitor with a diameter of only 21 inches is considered relatively large. The size of a video monitor is largely constrained by the more stringent resolution requirements for computer these devices. Further, streaming video screens only occupy a portion of the monitor on which they are displayed. For example, streaming media video screen resolutions on the order of 160×120 pixels, 176×132 pixels, 240×180 pixels and 320×420 pixels are quite common. It is not uncommon, on the other hand, to find video monitors that have resolutions on the order of 1024×768 pixels, 1280×1024 pixels or even 1600×1200 pixels. Thus, a streaming video window is quite small compared to that of a video monitor.

In any event, it would be much more difficult for a viewer to read closed caption data if it were displayed in a region that corresponds to the size of region 18 of FIG. 5. Further, video data that is delivered to end users via Internet web sites usually occupies less than the entire viewing area. This is typically because other portions of the site must still be displayed. Thus, it would be virtually impossible for a viewer to read closed caption data that were provided with corresponding video if it were delivered over the Internet in the same manner that it is delivered in a television system.

Figure 6:
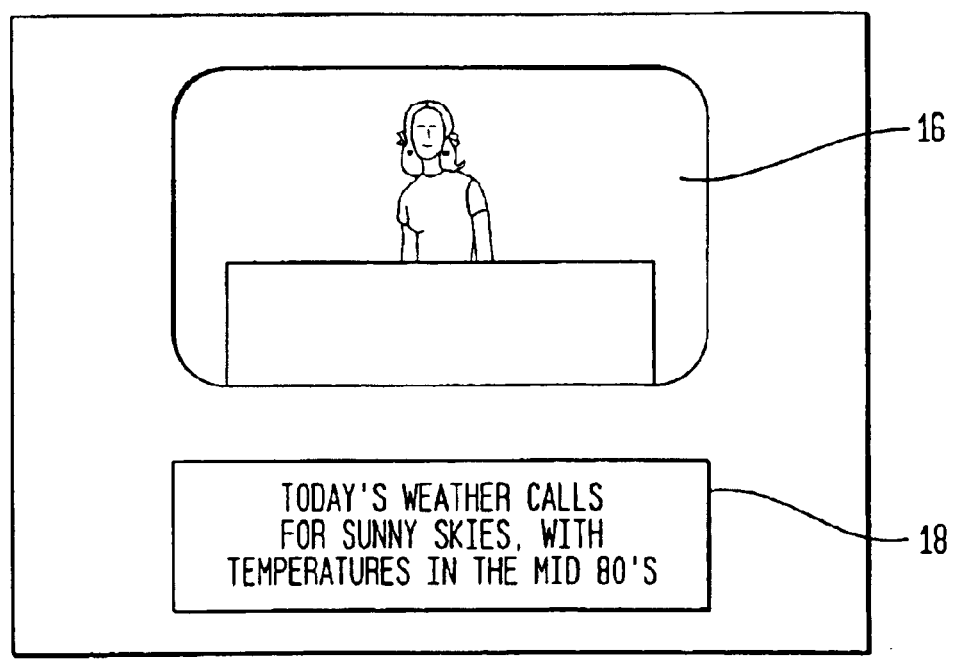
FIG. 6 is a schematic illustration of an end user processor with video and closed caption data displayed in the viewing area in accordance with an embodiment of the invention.

Turning to FIG. 6, the present invention provides an additional advantage, in that it delivers closed caption data to a closed caption region 18 that is specifically configured for a media player, rather than a television system. As shown, a media player often includes a video region 16 that is relatively small compared to that of a television screen (FIG. 5). However, the closed caption region 18 of the player is typically relatively large, and often lies outside of video region 16. Thus, it is much easier for a viewer to read closed caption data when it is delivered to a video monitor over the Internet in accordance with the invention.

In addition, television systems that display caption data typically include some mechanism, such as a button on the remote control, or a menu that is displayed on the screen, that allows the viewer to turn the captioning feature off. However, similar mechanisms are not currently provided for use with data that is delivered over the Internet. Thus, only open captions could be delivered over the Internet. That is, the end users would not be able to control the display of the captioning text, and it would continuously be displayed. Media players, however, can accommodate closed captioning by allowing end users to close the region 18 in which the captioning data is displayed.

It is, therefore, apparent that there has been provided, in accordance with the present invention, method and system for displaying related components of a media stream that has been transmitted over a computer network. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for simultaneously displaying text information with corresponding video information in a streaming media format, comprising: a buffer configured to communicate with a decoder and with an encoder and an information display system, said buffer receiving at least a portion of the text information from said decoder, and said buffer, in response to detection of an information release signal contained in said text information, transmitting a block of said received text information portion to said encoder for subsequent tranmittal to said information display system in streaming media format, wherein said information release signal delimits an end of said block, and wherein said buffer stores said block for an interval of time, said interval ending with said transmitting of said block of said text information portion; and wherein said transmitting of said block of said text information portion occurs prior to encoding of said text information into a streaming media format.

2. An apparatus as claimed in claim 1 further comprising a display configured to simultaneously present said block of said text information portion and said corresponding video information, said text information thus being displayed in a block-sized segment.

3. An apparatus as claimed in claim 2 wherein said display is a video monitor.

4. An apparatus as claimed in claim 1 wherein said buffer is further configured to transmit said text information portion to said information display system as a text script command.

5. An apparatus as claimed in claim 1 wherein said information display system comprises an audio-visual media player.

6. An apparatus as claimed in claim 1 wherein said video information comprises at least a portion of a video broadcast.

7. An apparatus as claimed in claim 1 wherein said text information comprises closed caption information.

8. An apparatus as claimed in claim 1 wherein said information release signal comprises a line feed character.

9. An apparatus for simultaneously displaying multiple components of a composite information stream, comprising: a storage device configured to communicate with an information extractor and with an information display system, said storage device receiving at least one component of the composite information stream from said information extractor, said storage device, in response to detection of an information release signal contained in said at least one composite information stream component transmitting a block of said at least one composite information stream component to an encoder for subsequent transmittal to said information display system in streaming media format, said information release signal delimiting an end of said block, wherein said storage device stores said block for an interval of time, said interval ending with said transmitting of said block of said at least one composite information stream; and wherein said transmitting of said block of said at least one composite information stream occurs prior to encoding of said at least one composite information stream component into a streaming media format.

10. An apparatus as claimed in claim 9 further comprising a display configured to receive a plurality of said composite information stream components, wherein at least one of said plurality of composite information stream components corresponds to one other of said plurality of composite information stream components, and wherein said display is configured to simultaneously present two or more of said corresponding composite information stream components.

11. An apparatus as claimed in claim 10 wherein said information display comprises a video monitor.

12. An apparatus as claimed in claim 9 wherein at least one of said composite information stream components comprises video information.

13. An apparatus as claimed in claim 9 wherein at least one of said composite information stream components comprises text information.

14. An apparatus as claimed in claim 9 wherein said storage device is further configured to transmit at least one of said received single information type components to said information display system as a text script command.

15. An apparatus as claimed in claim 9 wherein said information display system comprises an audio-visual media player.

16. An apparatus as claimed in claim 15 wherein said audio-visual media player comprises an audio-visual media player.

17. An apparatus as claimed in claim 9 wherein said information release signal comprises a line feed character.

18. An apparatus as claimed in claim 9 wherein said information stream comprises at least a portion of a television broadcast.

19. An apparatus as claimed in claim 18 wherein said at least one of said composite information stream components comprises closed caption information.

20. A system for simultaneously displaying multiple types of information on a video display in a streaming format, comprising:

a buffer configured to communicate with an information source that is capable of providing multiple types of information and with an information delivery system, said information delivery system comprising an encoder configured to communicate with an information display system, said buffer receiving at least one of said multiple types of information, said buffer also, in response to detection of an information release signal contained in said at least one of said multiple types of information, transmitting a block of said at least one of said multiple types of information to an encoder for subsequent transmittal to said information display system in streaming media format, said information release signal delimiting an end of said block; and said information delivery system being connected to said information source, to said buffer and to said information display device to receive at least two of said plurality of multiple types of information and to deliver at least two of said multiple types of information for simultaneous display on said information display device, said at least one of said multiple types of information thus being displayed as a block-sized segment, wherein said buffer stores said block for an interval of time, said interval ending with said transmitting of said block of said at least one of said multiple types of information; and wherein said transmitting of said block of said at least one of said multiple types of information occurs prior to encoding of said at least one of said multiple types of information into a streaming media format.

21. A system as claimed in claim 20 wherein said information display system comprises an encoder, and said buffer is further configured to transmit at least one of said multiple information type components to said encoder as a text script command.

22. A system as claimed in claim 20 wherein said information display system comprises an audio-visual media player.

23. A system as claimed in claim 20 wherein said information source delivers a television broadcast.

24. A system as claimed in claim 20 wherein said information source delivers closed caption information.

25. A system as claimed in claim 24 wherein said information release signal comprises a line feed character.

26. A system as claimed in claim 20 wherein said information display device is a video monitor.

27. A method of simultaneously displaying multiple types of information in a streaming media format, comprising:

receiving multiple types of corresponding information;

extracting at least one component of said received information;

collecting said extracted component in an information storage device, wherein said extracted component comprises an information release signal;

in response to detection of said information release signal, transferring a block of said extracted component from said information storage device to an encoder for subsequent transmittal to an information display system in streaming media format, said information release signal delimiting an end of said block, wherein said information storage device stores said block for an interval of time, said interval ending with said transferring of said block; and wherein said transferring of said block occurs prior to encoding of said extracted component into a streaming media format; and delivering said block of said extracted component from said information storage device and at least one unextracted component of said received information to an information display so as to display said block of said extracted component along with the unextracted component, said extracted component thus being displayed as a block-sized segment.

28. A method as claimed in claim 27 further comprising transferring said information storage device content to said information display system as a text script command.

29. A method as claimed in claim 27 further simultaneously comprising forwarding one or more of said extracted components and one or more of said unextracted components to an audio-visual media player.

30. A method as claimed in claim 27 wherein at least one of said unextracted components comprises video information.

31. A method as claimed in claim 27 wherein at least one of said extracted components comprises text information.

32. A method as claimed in claim 27 further comprising transmitting at least one of said extracted component to said information display system as a text script command.

33. A method as claimed in claim 27 wherein said information storage device content is transferred to said information display system by an audio-visual media player.

34. A method as claimed in claim 27 wherein said information display system comprises an audio-visual media player.

35. A method as claimed in claim 27 wherein said information release signal comprises a line feed character.

36. A method as claimed in claim 27 wherein said information display system comprises a video monitor.

37. A method as claimed in claim 27 wherein said information stream comprises at least a portion of a television broadcast.

38. A method as claimed in claim 37 wherein said at least one of said composite information stream components comprises closed caption information.

39. A method of simultaneously displaying text information and video information over the Internet in a streaming media format, the method comprising:

receiving information, said received information comprising video information and corresponding text information;

extracting said text information from said received information;

collecting said extracted text information in an information storage device, wherein said extracted text information comprises text characters, one of which characters being pre-selected to serve as an information release signal; and in response to detection of said information release signal, transferring a predetermined segment of said extracted text information from said information storage device to an encoder, said information release signal delimiting an end of said predetermined segment, wherein said information storage device stores said predetermined segment for an interval of time, said interval ending with said transferring of said predetermined segment; and wherein said transferring of said predetermined segment occurs prior to encoding of said extracted text information into a streaming format.

40. A method as claimed in claim 39, further comprising delivering said predetermined segment of said extracted text information from said information storage device and said received video information to a media player so as to display said predetermined segment of text information along with said received video information, said text information thus being displayed as a predetermined aggregation of said received text information.

41. A method as claimed in claim 40, wherein said predetermined segment is transferred to said encoder as a text script command.

* * * * *